Patented Sept. 7, 1926.

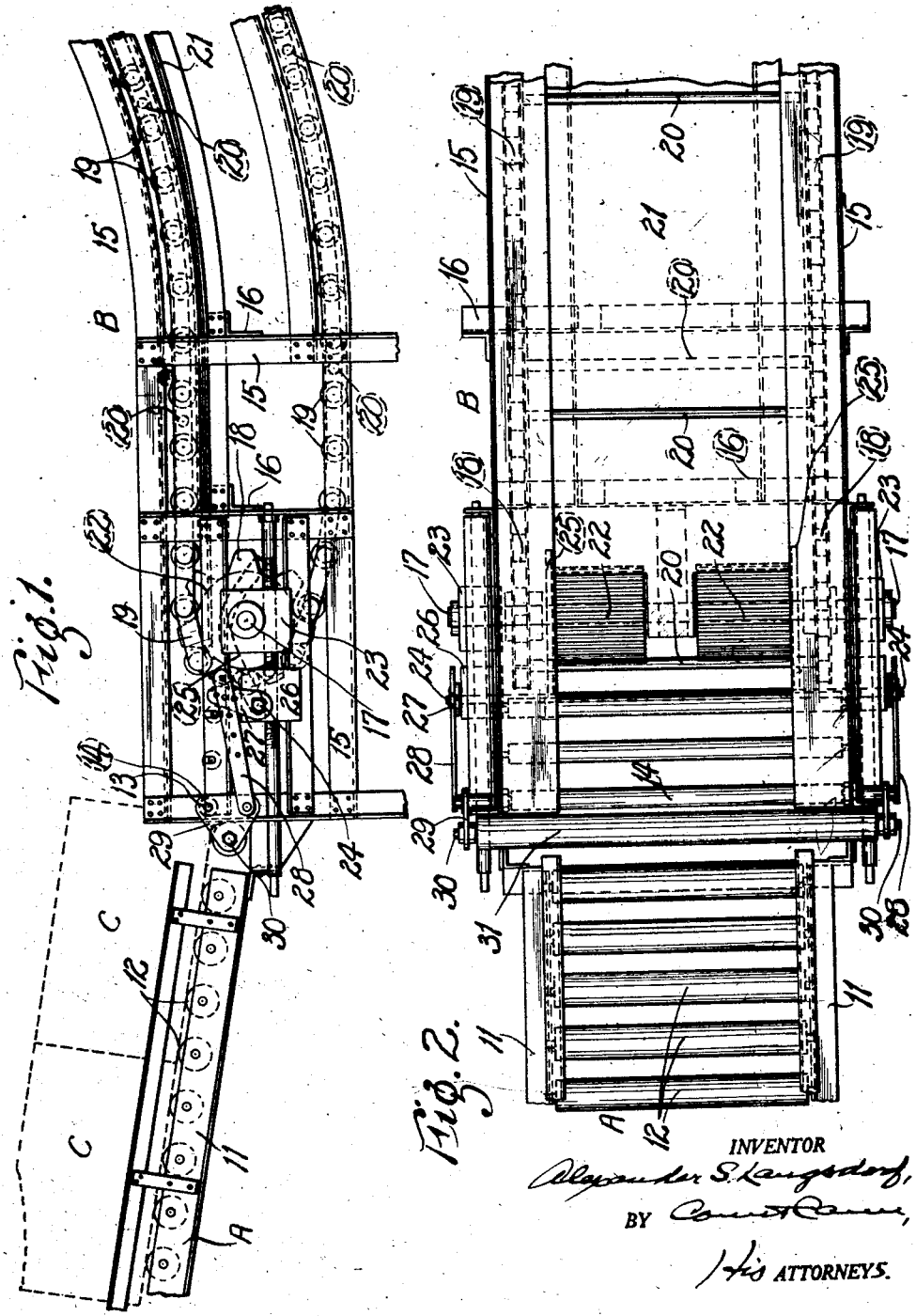

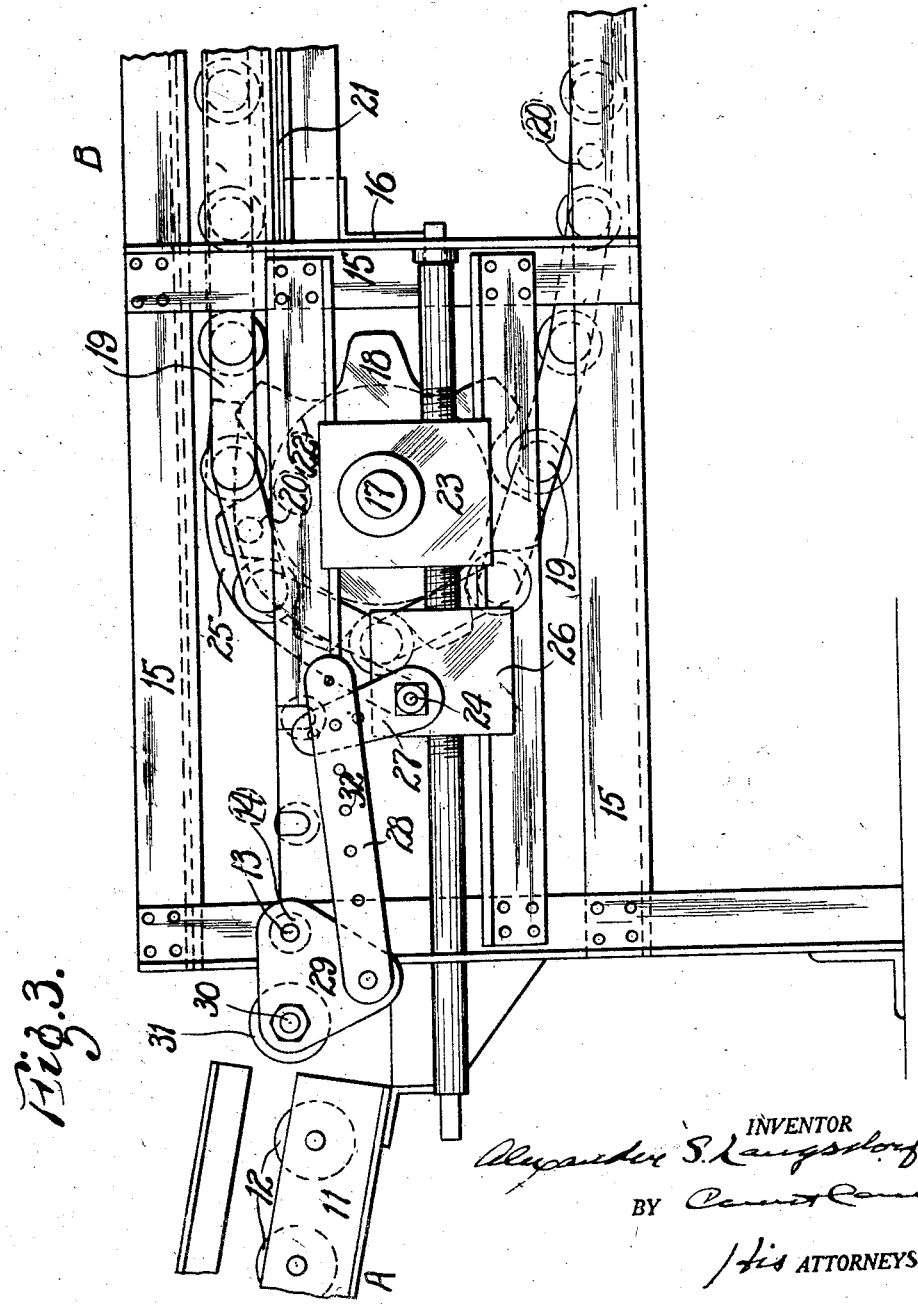

1,598,916

UNITED STATES PATENT OFFICE.

ALEXANDER S. LANGSDORF, OF ST. LOUIS, MISSOURI, ASSIGNOR TO ALVEY MANUFACTURING COMPANY, OF ST. LOUIS, MISSOURI, A CORPORATION OF MISSOURI.

FEED-REGULATING DEVICE FOR ELEVATORS.

Application filed January 7, 1925. Serial No. 1,106.

My device relates to means for regulating the feed of articles to a power conveyor or elevator and has for its principal object to insure the placement of the articles on the power conveyor one at a time and in proper position. The invention consists principally in an article stop interposed between the power conveyor and the gravity conveyor or other feed device in combination with means for lifting the forward end of the article above such stop. It also consists in the combinations and arrangements of parts hereinafter described and claimed.

In the accompanying drawing wherein like numerals refer to like parts wherever they occur, Figure 1 is a side elevation of a portion of the conveyor system embodying my invention;

Figure 2 is a plan view of the construction illustrated in Figure 1; and

Figure 3 is an enlarged side elevation of the mechanism illustrated in Figure 1.

The accompanying drawing illustrates my invention embodied in a system comprising a gravity conveyor A and a power conveyor B adapted to receive packages C from said gravity conveyor.

The gravity conveyor is of any suitable type, the construction illustrated herein comprising ordinary side rails 11 and a way made up of anti-friction rollers 12 mounted on said side rails. At the lower end of the gravity conveyor is a stop adapted to block the passage of articles descending said gravity conveyor. In the specific form illustrated, this article stop consists of a cross-bar 13 mounted on the side rails and a roller 14 mounted on said cross-bar, the roller being high and strong enough to stop any articles that come down the gravity conveyor but low enough for an article on said conveyor to run over when its front end is lifted high enough to rest on said roller.

In the specific form of power conveyor illustrated, there are side frames 15 connected by suitable cross pieces 16 and supporting a rotary shaft 17 that is journaled therein. This shaft is driven from any suitable source of power and has fixed thereon two sprocket wheels 18 that cooperate with sprocket chains 19 located between the side frames and close to them respectively. The chains are connected by suitable pusher bars 20 or cross-members that are mounted thereon; and at a suitable distance below the upwardly inclined portion of the path of the pusher bars is an inclined slideway 21 for the articles. Also mounted on said shaft between the said sprocket chains is a longitudinally corrugated drum or drums 22, the parts being so positioned that the top of the drum is about on the level with or slightly lower than the top of the article stop 14 hereinbefore mentioned. The shaft is mounted in journal boxes 23 that are capable of adjustment by any suitable means to a limited extent towards and from said article stop.

Mounted on a shaft 24 that is mounted parallel with the sprocket wheel shaft 17 and between said sprocket wheel shaft and the gravity conveyor, is an elongated arm or arms 25 that extend a considerable distance in the direction of the power conveyor and lie in position for the pusher bars 20 to bear against. The length of these arms is correlated with the length of the articles and the spacing of the pusher bars; and the lower edge thereof is so shaped that when an arm is in its raised position, the end portion of said lower edge lies in the path of travel of the top of the pusher bar. By this arrangement, a pusher bar will begin to bear against the under edge of the arm soon after said pusher bar begins its upward course around the sprocket wheel shaft, and from that point the pusher bar lifts said arm throughout a wide arc to its raised position; and in this raised position, as above stated, the curvature of the end portion of the lower edge of the arm coincides with the line of travel of the pusher bar so that the pusher bar serves only to support the arm in its raised position until the pusher bar travels out from under the end of said arm, whereupon the arm falls to its original position. To permit this fall, it is obviously necessary that the length of the arm be less than the distance between pusher bars. The support 26 for said shaft 24 is adjustable after the manner of shaft 17.

The movement of the arm or arms 25 is utilized for lifting the forward end of articles higher than the article stop 14. For this purpose, the arm or arms 25 may be in the form of a lever pivotally mounted on the shaft 24, or it may be fixed to said shaft to form therewith a rock shaft construction which has one or more upwardly projecting rock arms 27 fixed thereto. Connected to this upwardly extending lever arm or rock arm (or arms) 27 is a link (or links) 28 whose other end is pivotally connected to a member (or members) 29 which in turn is pivotally mounted on extensions of the cross bar 13 of the article stop or on other supports especially provided therefor. In the construction shown in the drawing, the pivotal member is in the form of triangular plates suspended from the respective end portions of said crossbar at their upper corners and with the links 28 connected to their lower front corners and joined together at their lower rear corners by a cross piece 30 with an anti-friction roller 31 mounted thereon. In the normal position of the parts, corresponding to the lowermost position of the arms 25, the roller 31 supported on the triangular members is in position to function as a part of the roller-way. It is noted that the links 28 have a series of spaced perforations 32 therein, which are provided for the purpose of adjusting the connection of the rock arms 27 to the triangular members conformably to the adjustment of the sprocket wheel shaft to the gravity conveyor, as hereinbefore mentioned.

The operation of the device is as follows: In the normal condition, the elongated arms 25 and the article lifting roller 31 are in their lowermost positions. Assuming that an article from the gravity conveyor has come to rest against the stop 14, its front end lies on or above the lifting roller. As the sprocket chains move, a pusher bar thereon begins to bear against the under edges of the arms 25 and to raise said arms to their uppermost position, after which it keeps them in this uppermost position without otherwise affecting them until the pusher bar moves beyond the ends of said arms. The upward movement of the rock arms is transmitted through the links 28 to the triangular members 29 and causes them to raise the article lifting cross piece, as hereinbefore described. The parts are so designed that the upward movement of the article lifting cross piece raises the front end of the article above the stop; and as the rear end of the article is enough higher than the top of the stop to move forward under the influence of gravity, the article moves forwardly until its front end rides onto or over the corrugated drum 22 on the sprocket wheel shaft, whereupon said drum, by frictional contact therewith, boosts it along far enough for the next following pusher bar to bear against the rear end of the article and push it up the slideway. As soon as the first mentioned pusher bar slides out from under the rock arms, they drop to their normal position and the motion is transmitted to the article lifting cross piece and it also drops to its lowermost position. In the meanwhile, the article lifting cross piece has been functioning as a stop to bar and hold back the article that has now become the lowermost article on the gravity conveyor; and while this article lifting device is moved down to its initial position, said endmost article moves forward to the permanent roller stop 14 and everything is ready for a repetition of the cycle of operation.

It is noted that by reason of the simplicity of my device, it is relatively inexpensive to make, reliable in operation, and strong enough to resist the severe conditions of practical service; and it is easily and quickly adjustable for taking care of articles of various sizes.

Obviously the construction hereinbefore described admits of considerable modification without departing from my invention. For instance, any suitable type of gravity conveyor may be used, and any suitable type of power conveyor or elevator may be used. Likewise, the means for transmitting motion from the conveyor chains or belts to the article lifting device admits of wide variation; or the article lifting device may be actuated by a magnet or the like controlled by a switch arranged to be operated by the power conveyor mechanism or chain after the manner of the curved arm, hereinbefore described. So far as I know, it is original with me to devise a construction wherein articles are lifted to pass over a permanent stop interposed between a gravity conveyor and a power conveyor fed thereby and I do not wish to be limited to the construction shown.

What I claim is:

1. The combination with a power conveyor and a gravity conveyor for feeding the same, of a stop between said conveyors and means for lifting the forward end of an article on said gravity conveyor to permit it to pass over said stop, the top of said stop being lower than the point in the gravity conveyor where the rear end of the article stopped thereby rests, whereby such article tends to move by gravity over said stop when its front end is raised high enough.

2. The combination with a power conveyor and a device for feeding articles thereto, of a stop and means separate from said feeding device for lifting articles to let them pass over said stop one at a time under the influence of the feeding device, said means in its elevated position constituting a stop for the article next following the article lifted by said means.

3. The combination with a power conveyor and a device for feeding articles thereto, of a stop and means for lifting articles to let them pass over said stop one at a time under the influence of the feeding device, said means in its elevated position constituting a stop for the article next following the article lifted by said means, said lifting means comprising a frame pivotally mounted near said stop and extending downwardly and backwardly therefrom and operatively connected to said power conveyor to be actuated thereby at intervals.

4. The combination with a power conveyor and a stationary gravity conveyor arranged to deliver articles onto said power conveyor, of an article stop near the lower end of said gravity conveyor and means permanently located close to said stop for lifting the forward end of the lowermost article on said gravity conveyor high enough above said gravity conveyor to pass over said stop.

5. The combination with a power conveyor and a stationary gravity conveyor arranged to deliver articles onto said power conveyor, of an article stop near the lower end of said gravity conveyor and means for lifting the forward end of the lowermost article on said gravity conveyor high enough above said gravity conveyor to pass over said stop, said means comprising an upwardly movable frame back of said stop and normally positioned low enough for the endmost article on said gravity conveyor to pass above it.

6. The combination with a power conveyor and a stationary gravity conveyor arranged to deliver articles onto said power conveyor, of an article stop near the lower end of said gravity conveyor and means for lifting the forward end of the lowermost article on said gravity conveyor high enough above said gravity conveyor to pass over said stop, said means comprising an upwardly movable frame back of said stop and normally low enough for an article on said gravity conveyor to run above it, and operatively connected to said power conveyor to be actuated thereby periodically.

7. The combination with a power conveyor comprising a shaft, sprocket wheels thereon, sprocket chains and pusher bars therefor, of pivotally mounted arms arranged in the path of said pusher bars to be moved thereby, means for feeding articles to said power conveyor, an article stop and means for lifting the forward end of the endmost article to let it pass over said stop, said lifting means being operatively connected to said arms to be actuated thereby and being arranged to have the rear end of the article on said feeding means to be supported thereby.

8. The combination with a power conveyor comprising a shaft, sprocket wheels thereon, sprocket chains and pusher bars therefor, of pivotally mounted arms arranged in the path of said pusher bars to be moved thereby, means for feeding articles to said power conveyor, an article stop and means for lifting the front end of the endmost article while the rear end thereof rests on said feeding means so as to let said article pass over said stop, said lifting means comprising an upwardly swinging frame pivoted close to said stop and having a roller thereon and being operatively connected to said arms to be actuated thereby, said lifting means constituting a stop for the next following article and said arms being sufficiently elongated to maintain such lifting means in elevated position until the endmost articles is in proper position on the power conveyor.

9. The combination with a power conveyor comprising a shaft, sprocket wheels thereon, sprocket chains and pusher bars therefor, of pivotally mounted arms arranged in the path of said pusher bars to be moved thereby, a stationary gravity conveyor for delivering articles onto said power conveyor, an article stop at the end of said gravity conveyor, and means for lifting the endmost article high enough above said conveyor to let it pass over said stop, said lifting means being operatively connected to said arms to be actuated thereby.

Signed at St. Louis, Missouri, this 3rd day of January, 1925.

ALEXANDER S. LANGSDORF.